(12) United States Patent
Runeson

(10) Patent No.: US 12,401,603 B2
(45) Date of Patent: Aug. 26, 2025

(54) DATA TRAFFIC CONTROL

(71) Applicant: Telefonaktiebolaget LM Ericsson (publ), Stockholm (SE)

(72) Inventor: Stefan Runeson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 369 days.

(21) Appl. No.: 17/800,052

(22) PCT Filed: Feb. 19, 2020

(86) PCT No.: PCT/EP2020/054397
§ 371 (c)(1),
(2) Date: Aug. 16, 2022

(87) PCT Pub. No.: WO2021/164870
PCT Pub. Date: Aug. 26, 2021

(65) Prior Publication Data
US 2023/0076812 A1    Mar. 9, 2023

(51) Int. Cl.
*H04L 47/263* (2022.01)
*H04L 47/2425* (2022.01)
*H04L 47/26* (2022.01)

(52) U.S. Cl.
CPC ........ *H04L 47/263* (2013.01); *H04L 47/2425* (2013.01); *H04L 47/266* (2013.01)

(58) Field of Classification Search
CPC .. H04L 47/263; H04L 47/2425; H04L 47/266
(Continued)

(56) References Cited

U.S. PATENT DOCUMENTS

2008/0228932 A1* 9/2008 Monette ............... H04L 47/10
709/229
2016/0041894 A1* 2/2016 Reid, III ............ G06F 11/3636
714/45
(Continued)

FOREIGN PATENT DOCUMENTS

EP    3429131 A1    1/2019

OTHER PUBLICATIONS

International Search Report and Written Opinion dated Nov. 13, 2020 for International Application No. PCT/EP2020/054397 filed Feb. 19, 2020; consisting of 13 pages.

*Primary Examiner* — Suraj M Joshi
*Assistant Examiner* — Ayele F Woldemariam
(74) *Attorney, Agent, or Firm* — Weisberg I.P. Law, P.A.

(57) ABSTRACT

Controlling data traffic of a communication network managed by a network operator, NWO. The data traffic includes first and second type traffic. The second type traffic is between a data service provider and an end user device provided by the OEM, and the first type traffic is between the OEM and the end user device. A controller acquires one or more device-specific second type traffic consumption parameters of the end user device, causing a downlink data traffic restrictor of the NWO to restrict downlink second type traffic between the data service provider and the end user device in accordance with the one or more device-specific second type traffic consumption parameters, and causes an uplink data traffic restrictor of the end user device to restrict uplink second type traffic between the data service provider and the end user device in accordance with the device-specific second type traffic consumption parameters.

17 Claims, 3 Drawing Sheets

(58) Field of Classification Search
USPC .......................................................... 709/238
See application file for complete search history.

(56) References Cited

U.S. PATENT DOCUMENTS

| | | |
|---|---|---|
| 2019/0245868 A1* | 8/2019 | Patil .................... H04L 63/1466 |
| 2020/0045519 A1* | 2/2020 | Raleigh ............... H04M 15/765 |
| 2020/0059452 A1* | 2/2020 | Ravichandran .... H04B 7/18593 |
| 2021/0123758 A1* | 4/2021 | Cajias .................. G08G 1/0125 |

* cited by examiner

DATA TRAFFIC CONTROL

CROSS-REFERENCE TO RELATED APPLICATIONS

This application is a Submission Under 35 U.S.C. § 371 for U.S. National Stage Patent Application of International Application Number: PCT/EP2020/054397, filed Feb. 19, 2020 entitled "DATA TRAFFIC CONTROL," the entirety of which is incorporated herein by reference.

TECHNICAL FIELD

The present disclosure relates generally to the field of data communication. More particularly, it relates to control of data traffic.

BACKGROUND

An end user device (EUD; e.g., a vehicle) is generally provided by an original equipment manufacturer (OEM). When the EUD is equipped with data connectivity, a data traffic subscription is typically required to enable data communication via a communication network. The communication network is managed by one or more network operator (NWO), issuing data traffic subscriptions.

A data traffic subscription that enables data communication of the EUD via a communication network may be associated with either the OEM or a user of the EUD (e.g., an owner or the EUD). Typically, a party associated with the subscription has an interest of controlling the data communication performed under the subscription.

Therefore, there is a need for approaches to data traffic control in these scenarios.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some disadvantages relating to data traffic control.

A first aspect is a method for controlling data traffic of a communication network managed by a network operator (NWO) wherein the data traffic is associated with a NWO subscription of an original equipment manufacturer (OEM) and comprises first type traffic and second type traffic. The second type traffic is between a data service provider and an end user device provided by the OEM, and the first type traffic is between the OEM and the end user device.

The method comprises a controller of the OEM performing the steps of acquiring one or more device-specific second type traffic consumption parameters of the end user device, causing a downlink data traffic restrictor of the NWO to restrict downlink second type traffic between the data service provider and the end user device in accordance with the one or more device-specific second type traffic consumption parameters, and causing an uplink data traffic restrictor of the end user device to restrict uplink second type traffic between the data service provider and the end user device in accordance with the one or more device-specific second type traffic consumption parameters.

In some embodiments, the one or more second type traffic consumption parameters specify whether or not second type traffic between the data service provider and the end user device is to be blocked, and/or a maximum allowed amount of second type traffic between the data service provider and the end user device.

In some embodiments, acquiring one or more device-specific second type traffic consumption parameters comprises receiving a signal indicative of at least one device-specific second type traffic consumption parameter, and/or detecting breach of an agreement between the OEM and a user of the end user device regarding at least one second type traffic consumption parameter.

In some embodiments, causing the downlink second type traffic restrictor of the NWO to restrict downlink second type traffic between the data service provider and the end user device in accordance with the one or more device-specific second type traffic consumption parameters comprises transmitting, to the NWO, a downlink traffic control signal indicative of the one or more device-specific second type traffic consumption parameters.

In some embodiments, causing the uplink second type traffic restrictor of the end user device to restrict uplink second type traffic between the data service provider and the end user device in accordance with the one or more device-specific second type traffic consumption parameters comprises transmitting, to the end user device, an uplink traffic control signal indicative of the one or more device-specific second type traffic consumption parameters.

In some embodiments, each of the downlink data traffic restrictor and/or the uplink data traffic restrictor comprises a firewall.

In some embodiments, the end user device comprises a vehicle, a house, an accommodation space, an industry robot, a household robot, a manufacturing machine, or a processing machine.

In some embodiments, the first type traffic between the OEM and the end user device comprises traffic for control of the end user device and/or for collecting operational data of the end user device.

In some embodiments, the first type traffic between the OEM and the end user device is not restricted by the one or more device-specific second type traffic consumption parameters.

In some embodiments, causing the downlink data traffic restrictor of the NWO to restrict downlink second type traffic in accordance with the one or more device-specific second type traffic consumption parameters comprises providing, to the NWO and/or to the downlink data traffic restrictor, downlink traffic filter parameters for identifying the second type traffic in the downlink data traffic restrictor.

In some embodiments, causing the uplink data traffic restrictor of the end user device to restrict uplink second type traffic in accordance with the one or more device-specific second type traffic consumption parameters comprises providing, to the uplink data traffic restrictor, uplink traffic filter parameters for identifying the second type traffic in the uplink data traffic restrictor.

In some embodiments, the traffic filter parameters indicate an Internet protocol, IP, 5-tuple comprising a source IP address, a source port number, a destination IP address, a destination port number, and a protocol type, wherein the protocol type is one of transmission control protocol, TCP, and user datagram protocol, UDP.

A second aspect is a method for controlling data traffic of a communication network managed by a network operator (NWO) wherein the data traffic is associated with a NWO subscription of an original equipment manufacturer (OEM) and comprises first type traffic and second type traffic. The second type traffic is between a data service provider and an end user device provided by the OEM, and the first type traffic is between the OEM and the end user device.

The method comprises a controller of the end user device performing the steps of acquiring an indication of one or more device-specific second type traffic consumption parameters of the end user device, and causing an uplink data traffic restrictor of the end user device to restrict uplink second type traffic between the data service provider and the end user device in accordance with the one or more device-specific second type traffic consumption parameters.

In some embodiments, acquiring the indication of one or more device-specific second type traffic consumption parameters of the end user device comprises receiving, from the OEM, an uplink traffic control signal indicative of the one or more device-specific second type traffic consumption parameters.

In some embodiments, causing the uplink data traffic restrictor of the end user device to restrict uplink second type traffic in accordance with the one or more device-specific second type traffic consumption parameters comprises providing, to the uplink data traffic restrictor, uplink traffic filter parameters for identifying the second type traffic in the uplink data traffic restrictor.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for controlling data traffic of a communication network managed by a network operator (NWO) wherein the data traffic is associated with a NWO subscription of an original equipment manufacturer (OEM) and comprises first type traffic and second type traffic. The second type traffic is between a data service provider and an end user device provided by the OEM, and the first type traffic is between the OEM and the end user device.

The apparatus comprises controlling circuitry configured to cause acquisition of one or more device-specific second type traffic consumption parameters of the end user device, restriction, by a downlink data traffic restrictor of the NWO, of downlink second type traffic between the data service provider and the end user device in accordance with the one or more device-specific second type traffic consumption parameters, and restriction, by an uplink data traffic restrictor of the end user device, of uplink second type traffic between the data service provider and the end user device in accordance with the one or more device-specific second type traffic consumption parameters.

A fifth aspect is an apparatus for controlling data traffic of a communication network managed by a network operator (NWO) wherein the data traffic is associated with a NWO subscription of an original equipment manufacturer (OEM) and comprises first type traffic and second type traffic. The second type traffic is between a data service provider and an end user device provided by the OEM, and the first type traffic is between the OEM and the end user device.

The apparatus comprises controlling circuitry configured to cause acquisition of an indication of one or more device-specific second type traffic consumption parameters of the end user device, and restriction, by an uplink data traffic restrictor of the end user device, of uplink second type traffic between the data service provider and the end user device in accordance with the one or more device-specific second type traffic consumption parameters.

A sixth aspect is an end user device comprising the apparatus of the fifth aspect and the uplink data traffic restrictor.

In some embodiments, any of the above aspects may additionally have features identical with or corresponding to any of the various features as explained above for any of the other aspects.

An advantage of some embodiments is that approaches are provided for control of data traffic to and/or from an end user device provided by an OEM, when the data traffic is associated with a NWO subscription of the OEM.

An advantage of some embodiments is that selective restriction of data traffic is enabled. Thereby, data traffic between the end user device and the OEM (e.g., telematics traffic) may continue unrestricted when data traffic between the end user device and a data service provider is restricted (e.g., blocked).

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
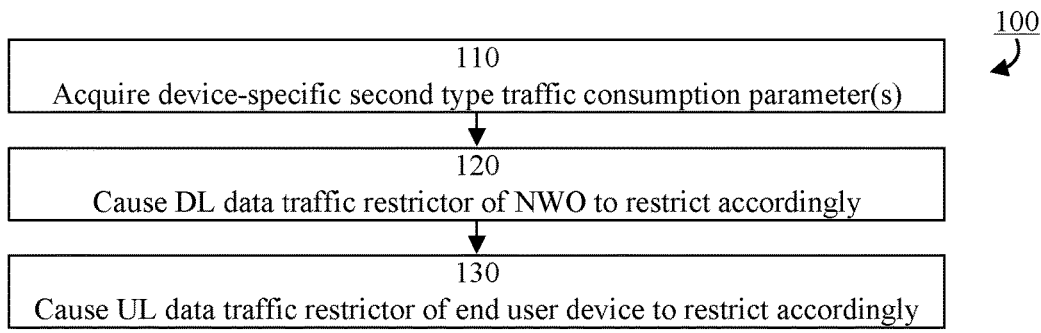
FIG. 1 is a flowchart illustrating example method steps according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where selective restriction of data traffic is enabled for control of data traffic to and/or from an end user device (EUD) provided by an OEM, when the data traffic is associated with a NWO subscription of the OEM. The NWO may, for example, be a mobile network operator (MNO).

In such scenarios, the OEM may have an interest of controlling the data communication performed under the subscription. For example, the OEM may desire to restrict (e.g., block or limit) data traffic between the EUD and a third party service provider (SP)—referred to herein as second type traffic—while leaving data traffic between itself and the EUD—referred to herein as first type traffic—unrestricted.

Generally, the first type traffic may comprise one or more of telematics traffic, traffic for control of the end user device (e.g., to enable the OED to (re)configure the EUD), and traffic for EUD data statistics purposes (e.g., to enable the OEM to collect operational data of the EUD). The second type traffic may, for example, comprise any data traffic that is not first type traffic (e.g., Internet traffic).

In a typical scenario, the OEM is associated with the NWO subscription and covers the costs related thereto towards the NWO, while an agreement between the OEM and a user (e.g., owner) of the EUD regulates to what extent the user covers the costs related to the second type traffic towards the OEM. Thus, the costs related to the first type traffic are covered by the OEM in this scenario, and the costs related to the second type traffic may be covered by the EUD user.

The interest of controlling the data communication may be due to economic reasons (e.g., that a user of the EUD is unwilling to cover the costs related to the second type traffic, or that an owner of the EUD is unwilling to cover the costs of the second type traffic when another user operates the EUD) and/or one or more other reasons.

Other reasons include, but are not limited to, priority reasons (e.g., temporarily blocking second type traffic to prioritize first type traffic in situations with low throughput capacity—which may increase reliability and/or throughput for the first type traffic), security reasons (e.g., temporary blocking second type traffic during a denial-of-service, DoS, attack or any other digital threat to the EUD), safety reasons (e.g., that a vehicle with no other occupants than a driver may be blocked from second type traffic to hinder the driver from being distracted), and child protection reasons (e.g., that an EUD is blocked from second type traffic when operated by a child).

In some embodiments, restricting the second type traffic may result in power and/or energy savings. For example, when the EUD needs to (e.g., temporarily) lower its power consumption for some reason (e.g., because a battery is running low) which may be detected by the OEM using the first type traffic, the OEM may cause restriction of the second type traffic.

The end user device (EUD) may comprise any device provided by an OEM and equipped with data connectivity. Particularly, the EUD may be any such device configured for first type traffic with the OEM. Example end user devices include a vehicle, a house, an accommodation space (apartment, hotel room, etc.), an industry robot, a household robot, a manufacturing machine, a processing machine, a factory facility. In the following, the EUD will be exemplified by a vehicle.

FIG. 1 illustrates an example method 100 according to some embodiments. The method 100 is performed by a controller (e.g., controlling circuitry, a control module, or a controlling device) of the OEM. The controller of the OEM may be comprised in a single device (e.g., a server) or may be distributed comprised in a plurality of devices (e.g., a processing cloud).

The method 100 is for controlling data traffic of a communication network managed by a network operator (NWO).

Generally, the communication network is managed by a NWO may be interpreted as the NWO owning one or more (e.g., all) material/physical devices that make up the communication network (e.g., radio access nodes, etc.), and/or as the NWO operating at least part of the signalling resources of the communication network. Thus, an operator using signalling resources of a physical network deployment not owned by the operator may be interpreted as a NWO managing a communication network enabled by the physical network deployment.

The data traffic is associated with a NWO subscription of an original equipment manufacturer (OEM) and comprises first type traffic and second type traffic. The second type traffic is between a data service provider (SP) and the EUD provided by the OEM, and the first type traffic is between the OEM and the EUD.

The method comprises acquiring one or more device-specific second type traffic consumption parameters of the end user device as illustrated in step 110.

The method also comprises causing a downlink data traffic restrictor of the NWO to restrict downlink second type traffic between the data service provider and the end user device in accordance with the one or more device-specific second type traffic consumption parameters as illustrated in step 120, and causing an uplink data traffic restrictor of the end user device to restrict uplink second type traffic between the data service provider and the end user device in accordance with the one or more device-specific second type traffic consumption parameters as illustrated in step 130.

Figure 2:
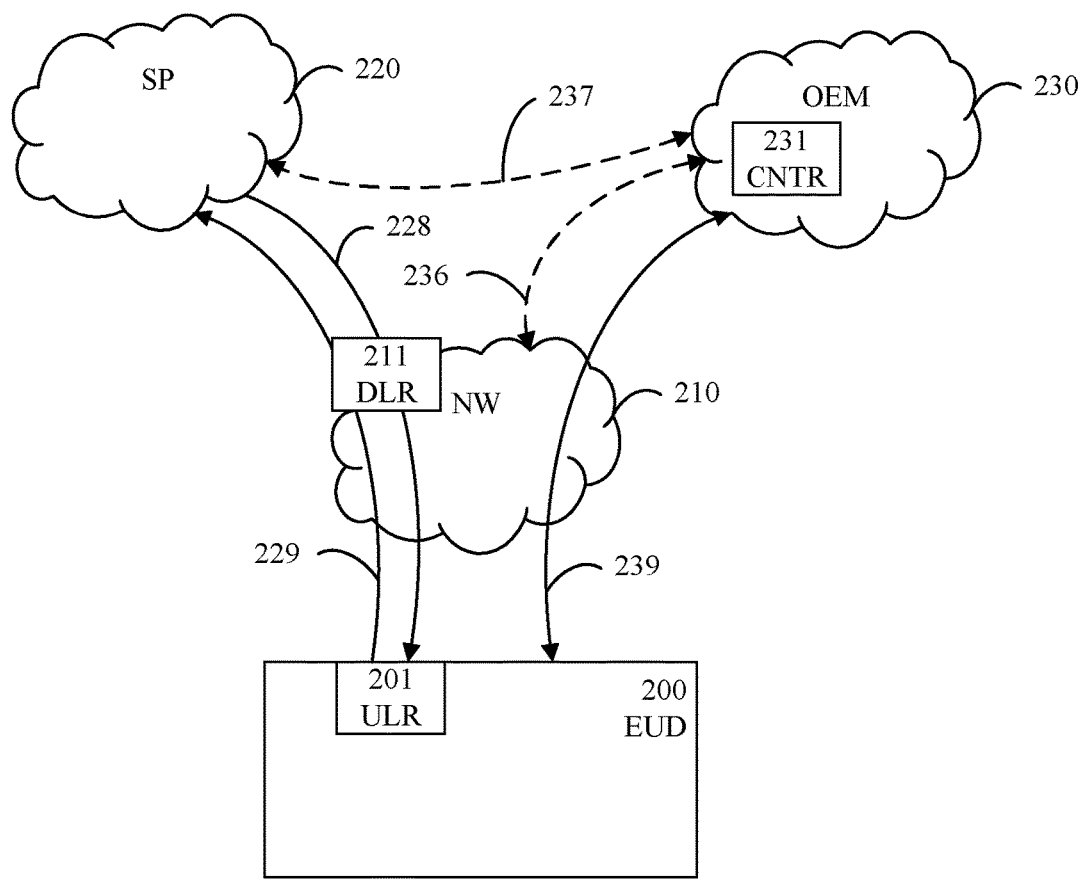
FIG. 2 is a schematic drawing illustrating an example data traffic scenario according to some embodiments.

FIG. 2 (schematically illustrating an example data traffic scenario according to some embodiments) and FIG. 3 (illustrating example method steps and signaling according to some embodiments) will be used to further exemplify the example method 100 in the following.

Figure 3:
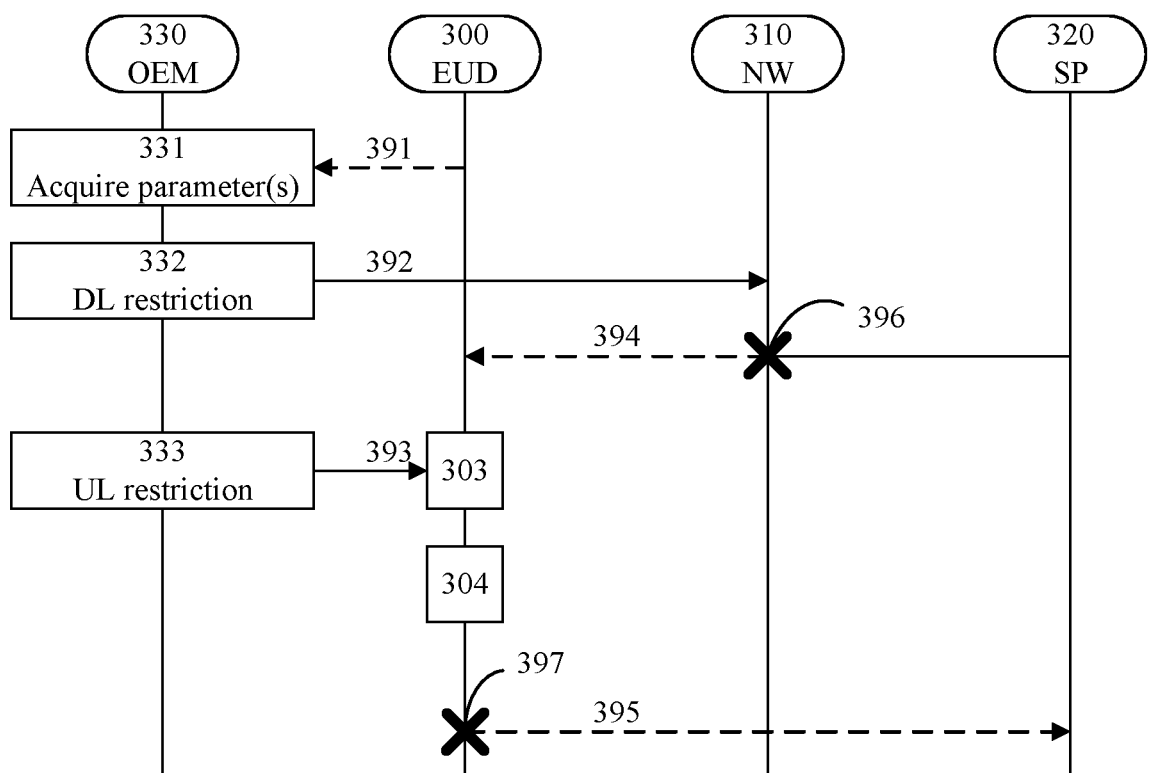
FIG. 3 is a combined flowchart and signaling diagram illustrating example method steps and signaling according to some embodiments.

FIGS. 2 and 3 show an end user device (EUD; e.g., a vehicle) 200, 300 and an original equipment manufacturer (OEM) 230, 330, which has provided the EUD 200, 300. A communication network (NW) 210, 310 provides for first type traffic 239 between the OEM and the EUD, as well as for second type traffic 228, 229 between the EUD and one or more service provider (SP) 220, 320.

The OEM has a controller (CNTR; e.g., controlling circuitry, a control module, or a controlling device) 231 for controlling, in the communication network 210, data traffic 228, 229, 239 associated with a NWO subscription of the OEM.

The control is achieved by acquiring one or more device-specific second type traffic consumption parameters of the end user device (compare with step 110 of FIG. 1).

The device-specific second type traffic consumption parameters may, for example, relate to whether—and possibly to what extent—a user of the EUD is willing to cover the costs of the second type traffic 228, 229 towards the OEM.

In some embodiments, the one or more second type traffic consumption parameters specify whether or not second type traffic between the data service provider and the end user device is to be blocked or allowed (e.g., blocking second type traffic when the user is not willing to cover costs for it and allowing second type traffic when the user is willing to cover costs for it).

Alternatively or additionally, the one or more second type traffic consumption parameters specify a maximum allowed amount of second type traffic between the data service provider and the end user device (e.g., allowing second type traffic up to a maximum amount of data per time unit and blocking second type traffic above the maximum amount of data per time unit).

The maximum allowed amount of second type traffic may, for example, be based on the amount of costs the user is willing to cover.

Yet alternatively or additionally, the one or more second type traffic consumption parameters specify one or more data services allowed to (or blocked from) utilize second type traffic between the data service provider and the end user device.

Generally, it should be noted that the second type traffic consumption parameters are device-specific, i.e., may differ between different instances of EUD provided by the same OEM.

Also generally, it should be noted that the device-specific second type traffic consumption parameters may be dynamic, i.e., may change over time. For example, the device-specific second type traffic consumption parameters may be changed responsive to a change of user of the EUD and/or responsive to a change of preferences of the user (e.g., in relation to willingness to cover costs of second type traffic).

In some embodiments, acquiring one or more device-specific second type traffic consumption parameters of the end user device may comprise receiving a signal indicative of at least one device-specific second type traffic consumption parameter. The signal may be received from the EUD or from another source.

For example, a user of the EUD may provide second type traffic consumption preferences (e.g., block/allow second type traffic, a maximum allowed amount of second type traffic, etc.) via a user interface of the EUD and a signal indicative of the corresponding device-specific second type traffic consumption parameter(s) may be transmitted from the EUD to the OEM using the first type traffic 239.

Alternatively or additionally, a user of the EUD may provide second type traffic consumption preferences via an interface (e.g., an Internet page) associated with the OEM and a signal indicative of the corresponding device-specific second type traffic consumption parameter(s) may be transmitted to the OEM over an Internet traffic connection 237 of the OEM.

For example, an EUD owner may change the preferences responsive to an identity of the current user of the EUD (e.g., blocking for a child, setting a relatively low maximum allowed amount when lending/renting the EUD to someone else, and setting a relatively high (or infinite) maximum allowed amount when the owner is using the EUD). Alternatively or additionally, the preferences may be changed responsive to the EUD changing owner.

Providing the second type traffic consumption preferences may, for example, comprise digitally signing an agreement (e.g., a legal contract) for covering costs of the second type traffic consumption and/or inputting one or more parameter values via the interface.

In some embodiments, acquiring one or more device-specific second type traffic consumption parameters of the end user device may (alternatively or additionally) comprise detecting breach of an agreement between the OEM and a user of the end user device regarding at least one second type traffic consumption parameter. For example, the OEM may have—or be associated with—a detector registering breach of the agreement.

One example of a breach of agreement may be when the EUD user has not paid for second type traffic as agreed with the OEM.

Alternatively or additionally, the device-specific second type traffic consumption parameters may relate to a throughput capacity of the communication network being—possibly temporarily—low (e.g., lower than a threshold value) in relation to the EUD. This may, for example, be detected by the NWO and signaled to the OEM over connection 236 between the NWO and the OEM.

Yet alternatively or additionally, the device-specific second type traffic consumption parameters may relate to a detection (e.g., by a sensor of a vehicle acting as EUD) that there are no non-driver occupants. This may, for example, be signaled to the OEM using first type traffic 239.

The control is further achieved by causing a downlink data traffic restrictor (DLR; e.g., a firewall) 211 of the NWO to restrict downlink second type traffic 228 between the data service provider and the end user device in accordance with the one or more device-specific second type traffic consumption parameters (compare with step 120 of FIG. 1), and causing an uplink data traffic restrictor (ULR; e.g., a firewall) 201 of the end user device to restrict uplink second type traffic 229 between the data service provider and the end user device in accordance with the one or more device-specific second type traffic consumption parameters (compare with step 130 of FIG. 1).

The control of the data traffic may also comprise not restricting the first type traffic 239 between the OEM and the EUD; at least not based on the one or more device-specific second type traffic consumption parameters.

Causing the downlink second type traffic restrictor of the NWO to restrict downlink second type traffic between the data service provider and the end user device in accordance with the one or more device-specific second type traffic consumption parameters may, for example, be achieved by transmitting, from the OEM to the NWO (e.g., using the connection 236), a downlink traffic control signal indicative of the one or more device-specific second type traffic consumption parameters, and the NWO may configure the downlink second type traffic restrictor accordingly. For example, the signal may comprise downlink traffic filter parameters for identifying the second type traffic in the downlink data traffic restrictor.

Alternatively or additionally, causing the downlink second type traffic restrictor of the NWO to restrict downlink second type traffic between the data service provider and the end user device in accordance with the one or more device-specific second type traffic consumption parameters may, for example, be achieved by the OEM (e.g., using the Internet connection 237) configuring an Internet exposed application programming interface (API) of the downlink second type traffic restrictor based on the one or more device-specific second type traffic consumption parameters (e.g., downlink traffic filter parameters for identifying the second type traffic in the downlink data traffic restrictor).

It is not uncommon that the NWO has a firewall deployed towards the Internet to protect the communication network of the NWO from threats from the Internet. The function of this type of firewall is not to be confused with the function of the downlink second type traffic restrictor. The downlink second type traffic restrictor is configured to restrict second type traffic to the EUD as already explained. The downlink second type traffic restrictor is dynamically configurable, as well as individually configurable in relation to each EUD instance.

Causing the uplink second type traffic restrictor of the end user device to restrict uplink second type traffic between the data service provider and the end user device in accordance with the one or more device-specific second type traffic consumption parameters may, for example, be achieved by transmitting, from the OEM to the EUD (e.g., using the first type traffic 239), an uplink traffic control signal indicative of the one or more device-specific second type traffic consumption parameters, and the EUD may configure the uplink second type traffic restrictor accordingly. For example, the signal may comprise uplink traffic filter parameters for identifying the second type traffic in the uplink data traffic restrictor. Typically, the configuration of the uplink second type traffic restrictor is entirely under the control of the OEM and/or cannot be controlled by an owner or user of the EUD.

Generally, the downlink and/or uplink traffic filter parameters (for identifying different traffic flows) may be any suitable parameters.

For example, the downlink and/or uplink traffic filter parameters (for identifying different traffic flows) may indicate an Internet protocol (IP) 5-tuple comprising a source IP address, a source port number, a destination IP address, a destination port number, and a protocol type (e.g., transmission control protocol, TCP, or user datagram protocol, UDP). In some embodiments, one or more of the IP 5-tuple components may be disregarded for the downlink and/or uplink traffic filter (e.g., by using a so called "don't-care value" for 5-tuple component(s) to be disregarded). In one example, the source IP address may have a defined value to be used for the downlink and/or uplink traffic filtering, and all other parameters may have a "don't-care value".

Filters for the different data traffic flows in the restrictors can be created based on this IP 5-tuple. For example, the filter for the first type traffic (e.g., telematics services) captures data traffic from source IP addresses of all corresponding servers in a cloud of the vehicle OEM, and the filter for Internet access captures data traffic from all other source IP addresses.

FIG. 3 shows example method steps of—and example signalling between—the OEM 330 (compare with 230 of FIG. 2), the EUD 300 (compare with 200 of FIG. 2), the NW 310 (compare with 210 of FIG. 2), and the SP 320 (compare with 220 of FIG. 2).

As illustrated by 331, the OEM 330 acquires one or more device-specific second type traffic consumption parameters of the end user device (compare with step 110 of FIG. 1 and exemplification in connection with FIG. 2). For example, one or more of the one or more device-specific second type traffic consumption parameters may be indicated in a signal 391 transmitted by the EUD and received by the OEM.

The OEM causes a downlink data traffic restrictor of the NWO to restrict downlink second type traffic between the data service provider and the end user device in accordance with the one or more device-specific second type traffic consumption parameters, as illustrated by 332 (compare with step 120 of FIG. 1 and exemplification in connection with FIG. 2). For example, causing the downlink second type traffic restriction may comprise the OEM transmitting a signal 392 indicative of downlink traffic filter parameters to the network for configuration of the downlink data traffic restrictor.

After configuration of the downlink data traffic restrictor, potential downlink second type traffic 394 between the data service provider and the end user device is restricted (e.g., blocked) in the NW as illustrated by 396.

The OEM also causes an uplink data traffic restrictor of the EUD to restrict uplink second type traffic between the data service provider and the end user device in accordance with the one or more device-specific second type traffic consumption parameters, as illustrated by 333 (compare with step 130 of FIG. 1 and exemplification in connection with FIG. 2). For example, causing the uplink second type traffic restriction may comprise the OEM transmitting a signal 393 indicative of uplink traffic filter parameters to the EUD for configuration of the uplink data traffic restrictor.

After acquiring the indication of one or more device-specific second type traffic consumption parameters of the end user device as illustrated by 303, the EUD causes the uplink data traffic restrictor of the end user device to restrict uplink second type traffic between the data service provider and the end user device in accordance with the one or more device-specific second type traffic consumption parameters as illustrated by 304.

After configuration of the uplink data traffic restrictor, potential uplink second type traffic 395 between the data service provider and the end user device is restricted (e.g., blocked) at the EUD as illustrated by 397.

It should be noted that, even though steps 120 and 130 (and correspondingly 332 and 333) have been described herein as being performed in that order, these steps can, according to various embodiments, be performed in any order (e.g., 130/333 followed by 120/332), as well as—partly or fully—in parallel. In some embodiments, there may even be multiple executions of step 120/332 for each execution of step 130/333; or vice versa.

Figure 4:
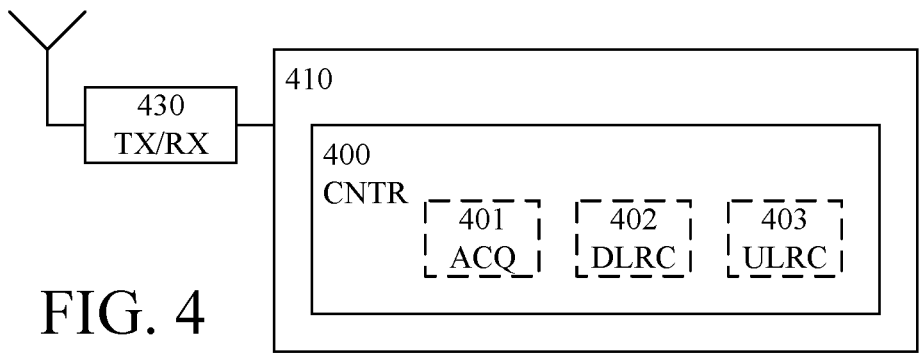
FIG. 4 is a schematic block diagram illustrating an example apparatus according to some embodiments.

FIG. 4 schematically illustrates an example apparatus 410 according to some embodiments. The apparatus 410 may be comprisable, or comprised, in one or more devices of the OEM (e.g., a server or distributed comprised in a plurality of servers of a processing cloud). Alternatively or additionally, the apparatus 410 may be configured to perform one or more method steps as described in connection with FIGS. 1 through 3.

The apparatus 410 is for controlling data traffic of a communication network managed by a network operator (NWO). The data traffic is associated with a NWO subscription of an original equipment manufacturer (OEM) and comprises first type traffic and second type traffic, wherein the second type traffic is between a data service provider and an end user device provided by the OEM, and the first type traffic is between the OEM and the end user device.

The apparatus 410 comprises a controller (CNTR; e.g., controlling circuitry or a control module) 400 (compare with 231 of FIG. 2).

The controller 400 is configured to cause acquisition of one or more device-specific second type traffic consumption parameters of the end user device (compare with 110 of FIG. 1 and 331 of FIG. 3).

To this end the controller may comprise or be otherwise associated with (e.g., operably connectable, or connected, to) an acquirer (ACQ; e.g., acquiring circuitry or an acquisition module) 401. The acquirer may be configured to acquire the one or more device-specific second type traffic consumption parameters of the end user device; possibly by reception of a signal via a receiver (RX) 430 associated with the apparatus 410.

The controller 400 is also configured to cause restriction, by a downlink data traffic restrictor of the NWO, of downlink second type traffic between the data service provider and the end user device in accordance with the one or more device-specific second type traffic consumption parameters (compare with 120 of FIG. 1 and 332 of FIG. 3).

To this end the controller may comprise or be otherwise associated with (e.g., operably connectable, or connected, to) a downlink restriction controller (DLRC; e.g., controlling circuitry or a control module) 402. The downlink restriction controller may be configured to cause the restriction of downlink second type traffic; possibly by transmission of a signal via a transmitter (TX) 430 associated with the apparatus 410.

The controller 400 is also configured to cause restriction, by an uplink data traffic restrictor of the EUD, of uplink second type traffic between the data service provider and the end user device in accordance with the one or more device-specific second type traffic consumption parameters (compare with 130 of FIG. 1 and 333 of FIG. 3).

To this end the controller may comprise or be otherwise associated with (e.g., operably connectable, or connected, to) an uplink restriction controller (ULRC; e.g., controlling circuitry or a control module) 403. The uplink restriction controller may be configured to cause the restriction of uplink second type traffic; possibly by transmission of a signal via a transmitter (TX) 430 associated with the apparatus 410.

Figure 5:
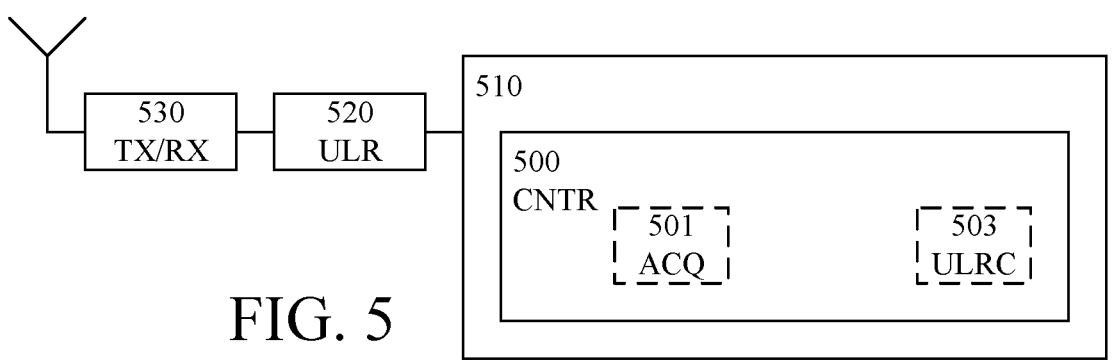
FIG. 5 is a schematic block diagram illustrating an example apparatus according to some embodiments.

FIG. 5 schematically illustrates an example apparatus 510 according to some embodiments. The apparatus 510 may be comprisable, or comprised, in the EUD. Alternatively or additionally, the apparatus 510 may be configured to perform one or more method steps as described in connection with FIGS. 2 through 3.

The apparatus 510 is for controlling data traffic of a communication network managed by a network operator (NWO). The data traffic is associated with a NWO subscription of an original equipment manufacturer (OEM) and comprises first type traffic and second type traffic, wherein the second type traffic is between a data service provider and an end user device provided by the OEM, and the first type traffic is between the OEM and the end user device.

The apparatus 510 comprises a controller (CNTR; e.g., controlling circuitry or a control module) 500.

The controller 500 is configured to cause acquisition of an indication of one or more device-specific second type traffic consumption parameters of the end user device (compare with 303 of FIG. 3).

To this end the controller may comprise or be otherwise associated with (e.g., operably connectable, or connected, to) an acquirer (ACQ; e.g., acquiring circuitry or an acquisition module) 501. The acquirer may be configured to acquire the indication of the one or more device-specific second type traffic consumption parameters of the end user device; possibly by reception of a signal via a receiver (RX) 530 associated with the apparatus 510.

The controller 500 is also configured to cause restriction, by an uplink data traffic restrictor (ULR) 520 of the end user device, of uplink second type traffic (potentially transmitted by a transmitter (TX) 530 associated with the apparatus 510) between the data service provider and the end user device in accordance with the one or more device-specific second type traffic consumption parameters.

To this end the controller may comprise or be otherwise associated with (e.g., operably connectable, or connected, to) an uplink restriction controller (ULRC; e.g., controlling circuitry or a control module) 503. The uplink restriction controller may be configured to cause the restriction of uplink second type traffic; possibly by configuration of the uplink data traffic restrictor 520.

An EUD (e.g., a vehicle) may comprise the apparatus 510, the uplink data traffic restrictor 520, and the transmitter/receiver (TX/RX) 530 according to some embodiments.

Thus, according to some embodiments, data traffic separation for connected vehicles is provided. Many vehicles are connected via mobile networks, and the number of such vehicle is expected to increase. The mobile connectivity may be used for a broad range of services; e.g., telematics, traffic safety, infotainment, navigation, and fleet management.

Several different actors may benefit from these services in connected vehicles. Examples include the vehicle owner, the vehicle manufacturer, road traffic authorities, and vehicle fleet owners. It may be cumbersome to technically implement an approach enabling proper division of cost for the data traffic arising from using the services.

Some technical solutions are based on dual (or a plurality of) built-in modems and corresponding subscriber identification module (SIM) cards in the vehicle. Such solutions entails extra manufacturing cost and/or bulkiness of the vehicle equipment. Furthermore, locations for suitable placement of external antennas may be limited.

Some technical solutions are based on one (single) built-in modem and one corresponding SIM card in the vehicle; complemented by a smartphone of a vehicle occupant. However, in this scenario, the smartphone cannot benefit from the external antenna and thereby experiences worse radio signal strength than the built-in modem.

According to some embodiments presented herein, a solution is provided based on one (e.g., single) built-in modem and one corresponding (e)SIM card in the vehicle. A mobile network operator (MNO) can identify data traffic flows to/from the vehicle relating to different services. Based on instructions provided by the OEM, a downlink restrictor of the MNO and an uplink restrictor of the vehicle can restrict selected data traffic flows and allow other data traffic flows to remain unrestricted.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as an OEM server or an end user device.

Embodiments may appear within an electronic apparatus (such as an OEM server or an end user device) comprising arrangements, circuitry, and/or logic according to any of the embodiments described herein. Alternatively or additionally, an electronic apparatus (such as an OEM server or an end user device) may be configured to perform methods according to any of the embodiments described herein.

Figure 6:
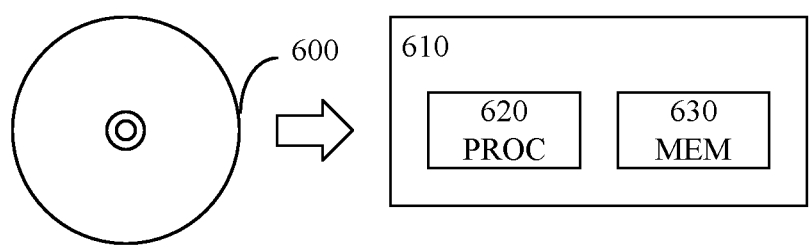
FIG. 6 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC; e.g., data processing circuitry or a data processing unit) 620, which may, for example, be comprised in an OEM server or an end user device 610. When loaded into the data processor, the computer program may be stored in a memory (MEM) 630 associated with or comprised in the data processor. According to some embodiments, the computer program may, when loaded into and run by the data processor, cause execution of method steps according to, for example, any of the methods illustrated in FIGS. 1 and/or 3; or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims.

Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for controlling data traffic of a communication network managed by a network operator, NWO, the data traffic being associated with an NWO subscription of an original equipment manufacturer, OEM, and comprises first type traffic and second type traffic, the second type traffic being between a data service provider and an end user device provided by the OEM, the second type traffic comprising downlink second type traffic and uplink second type traffic, and the first type traffic being between the OEM and the end user device, the method being implemented in an apparatus comprising a controller of the OEM, the method comprising:
    acquiring one or more device-specific second type traffic consumption parameters of the end user device by one or both of:
        receiving a signal indicative of at least one device-specific second type traffic consumption parameter; and
        detecting a breach of an agreement between the OEM and a user of the end user device regarding at least one second type traffic consumption parameter, the one or more device-specific second type traffic consumption parameters specifying one or both of:
            whether or not the second type traffic between the data service provider and the end user device is to be blocked; and
            a maximum allowed amount of the second type traffic between the data service provider and the end user device;
    in response to acquiring the one or more device-specific second type traffic consumption parameters, causing:
        a downlink data traffic restrictor of the NWO to restrict the downlink second type traffic between the data service provider and the end user device in accordance with the one or more device-specific second type traffic consumption parameters; and
        an uplink data traffic restrictor of the end user device to restrict the uplink second type traffic between the data service provider and the end user device in accordance with the one or more device-specific second type traffic consumption parameters.

2. A method for controlling data traffic of a communication network managed by a network operator, NWO, the data traffic being associated with an NWO subscription of an original equipment manufacturer, OEM, and comprises first type traffic and second type traffic, the second type traffic being between a data service provider and an end user device provided by the OEM, the second type traffic comprising downlink second type traffic and uplink second type traffic, and the first type traffic being between the OEM and the end user device, the method being implemented in a system comprising a first apparatus and a second apparatus, the first apparatus comprising a first controller of the OEM, the second apparatus comprising a second controller of the end user device, the method comprising:
    acquiring, by the first controller, one or more device-specific second type traffic consumption parameters of the end user device by one or both of:
        receiving a signal indicative of at least one device-specific second type traffic consumption parameter; and
        detecting a breach of an agreement between the OEM and a user of the end user device regarding at least one second type traffic consumption parameter, the one or more device-specific second type traffic consumption parameters specifying one or both of:
            whether or not the second type traffic between the data service provider and the end user device is to be blocked; and
            a maximum allowed amount of the second type traffic between the data service provider and the end user device;
    in response to acquiring the one or more device-specific second type traffic consumption parameters, causing, by the first controller:
        a downlink data traffic restrictor of the NWO to restrict the downlink second type traffic between the data service provider and the end user device in accordance with the one or more device-specific second type traffic consumption parameters:
        an uplink data traffic restrictor of the end user device to restrict the uplink second type traffic between the data service provider and the end user device in accordance with the one or more device-specific second type traffic consumption parameters:
    acquiring, by the second controller, an indication of the one or more device-specific second type traffic consumption parameters of the end user device; and in response to acquiring the indication of the one or more device-specific second type traffic consumption parameters, causing, by the second controller:
the uplink data traffic restrictor of the end user device to restrict the uplink second type traffic between the data service provider and the end user device in accordance with the one or more device-specific second type traffic consumption parameters.

3. An apparatus for controlling data traffic of a communication network managed by a network operator, NWO, the data traffic being associated with an NWO subscription of an original equipment manufacturer, OEM, and comprises first type traffic and second type traffic, being the second type traffic being between a data service provider and an end user device provided by the OEM, the second type traffic comprising downlink second type traffic and uplink second type traffic, and the first type traffic being between the OEM and the end user device, the apparatus comprising controlling circuitry configured to:
acquire one or more device-specific second type traffic consumption parameters of the end user device by one or both of:
receiving a signal indicative of at least one device-specific second type traffic consumption parameter; and
detecting a breach of an agreement between the OEM and a user of the end user device regarding at least one second type traffic consumption parameter, the one or more device-specific second type traffic consumption parameters specifying one or both of:
whether or not the second type traffic between the data service provider and the end user device is to be blocked; and
a maximum allowed amount of the second type traffic between the data service provider and the end user device;
in response to acquiring the one or more device-specific second type traffic consumption parameters, cause:
a downlink data traffic restrictor of the NWO to restrict the downlink second type traffic between the data service provider and the end user device in accordance with the one or more device-specific second type traffic consumption parameters; and
an uplink data traffic restrictor of the end user device to restrict the uplink second type traffic between the data service provider and the end user device in accordance with the one or more device-specific second type traffic consumption parameters.

4. The apparatus of claim 3, wherein the controlling circuitry is configured to cause the downlink data traffic restrictor of the NWO to restrict the downlink data traffic between the data service provider and the end user device in accordance with the one or more device-specific second type traffic consumption parameters by causing transmission, to the NWO, of a downlink traffic control signal indicative of the one or more device-specific second type traffic consumption parameters.

5. The apparatus of claim 3, wherein the controlling circuitry is configured to cause the uplink second type traffic restrictor of the end user device to restrict the uplink second type traffic between the data service provider and the end user device in accordance with the one or more device-specific second type traffic consumption parameters by causing transmission, to the end user device, of an uplink traffic control signal indicative of the one or more device-specific second type traffic consumption parameters.

6. The apparatus of claim 3, wherein one or more of:
all of the downlink data traffic restrictors; and
all of the uplink data traffic restrictors, comprises a firewall.

7. The apparatus of claim 3, wherein the end user device is at least a part of one of a vehicle, a house, an accommodation space, an industry robot, a household robot, a manufacturing machine, and a processing machine.

8. The apparatus of claim 3, wherein the first type traffic between the OEM and the end user device comprises traffic for one or more of control of the end user device and collecting operational data of the end user device.

9. The apparatus of claim 3, wherein the controlling circuitry is configured to cause the downlink data traffic restrictor of the NWO to restrict the downlink second type traffic in accordance with the one or more device-specific second type traffic consumption parameters by causing provision, to one or more of the NWO and the downlink data traffic restrictor, of downlink traffic filter parameters for identifying the second type traffic in the downlink data traffic restrictor.

10. The apparatus of claim 3, wherein the controlling circuitry is configured to cause the uplink data traffic restrictor of the end user device to restrict the uplink second type traffic in accordance with the one or more device-specific second type traffic consumption parameters by causing provision, to the uplink data traffic restrictor, of uplink traffic filter parameters for identifying the second type traffic in the uplink data traffic restrictor.

11. A system comprising a first apparatus and a second apparatus for controlling data traffic of a communication network managed by a network operator, NWO, the data traffic being associated with an NWO subscription of an original equipment manufacturer, OEM, and comprises first type traffic and second type traffic, the second type traffic being between a data service provider and an end user device provided by the OEM, the second type traffic comprising downlink second type traffic and uplink second type traffic, and the first type traffic being between the OEM and the end user device:
the first apparatus comprising first controlling circuitry configured to:
acquire one or more device-specific second type traffic consumption parameters of the end user device by one or both of:
receiving a signal indicative of at least one device-specific second type traffic consumption parameter; and
detecting a breach of an agreement between the OEM and a user of the end user device regarding at least one second type traffic consumption parameter, the one or more device-specific second type traffic consumption parameters specifying one or both of:
whether or not the second type traffic between the data service provider and the end user device is to be blocked; and
a maximum allowed amount of the second type traffic between the data service provider and the end user device;
in response to acquiring the one or more device-specific second type traffic consumption parameters, cause:
a downlink data traffic restrictor of the NWO to restrict the downlink second type traffic between the data service provider and the end user device in accordance with the one or more device-specific second type traffic consumption parameters; and an uplink data traffic restrictor of the end user device to restrict the uplink second type traffic between the data service provider and the end user device in accordance with the one or more device-specific second type traffic consumption parameters;

the second apparatus comprising second controlling circuitry configured to:

acquire an indication of the one or more device-specific second type traffic consumption parameters of the end user device; and in response to acquiring the indication of the one or more device-specific second type traffic consumption parameters, cause:

the uplink data traffic restrictor of the end user device to restrict the uplink second type traffic between the data service provider and the end user device in accordance with the one or more device-specific second type traffic consumption parameters.

12. The apparatus of claim 11, wherein the second controlling circuitry is configured to cause the acquisition of the indication of one or more device-specific second type traffic consumption parameters of the end user device by causing reception, from the OEM, of an uplink traffic control signal indicative of the one or more device-specific second type traffic consumption parameters.

13. The apparatus of claim 11, wherein the uplink data traffic restrictor comprises a firewall.

14. The apparatus of claim 11, wherein the end user device is at least a part of a vehicle, a house, an accommodation space, an industry robot, a household robot, a manufacturing machine, and a processing machine.

15. The apparatus of claim 11, wherein the first type traffic between the OEM and the end user device is not restricted by the one or more device-specific second type traffic consumption parameters.

16. The apparatus of claim 11, wherein the second controlling circuitry is configured to cause the uplink data traffic restrictor of the end user device to restrict the uplink second type traffic in accordance with the one or more device-specific second type traffic consumption parameters by causing provision, to the uplink data traffic restrictor, of uplink traffic filter parameters for identifying the second type traffic in the uplink data traffic restrictor.

17. The apparatus of claim 16, wherein the uplink traffic filter parameters indicate an Internet protocol, IP, 5-tuple comprising a source IP address, a source port number, a destination IP address, a destination port number, and a protocol type, wherein the protocol type is one of transmission control protocol, TCP, and user datagram protocol, UDP.

* * * * *